US005572730A

United States Patent [19]
Oda

[11] Patent Number: 5,572,730
[45] Date of Patent: Nov. 5, 1996

[54] METHOD OF GARBAGE COLLECTION PERFORMED UPON COMPLETION OF FUNCTION EXECUTION

[75] Inventor: Toshihiko Oda, Sagamihara, Japan

[73] Assignee: Ricoh Company, Ltd., Tokyo, Japan

[21] Appl. No.: 425,216

[22] Filed: Apr. 18, 1995

Related U.S. Application Data

[63] Continuation of Ser. No. 906,481, Jun. 30, 1992, abandoned.

[30] Foreign Application Priority Data

| Jul. 4, 1991 | [JP] | Japan | 3-164199 |
| Jul. 10, 1991 | [JP] | Japan | 3-169681 |
| Dec. 24, 1991 | [JP] | Japan | 3-339188 |

[51] Int. Cl.$^6$ .................................................. G06F 12/00
[52] U.S. Cl. .................. 395/616; 364/281.1; 364/DIG. 1
[58] Field of Search .......................................... 395/600

[56] References Cited

U.S. PATENT DOCUMENTS

| 4,755,939 | 7/1988 | Watson | 395/600 |
| 4,912,629 | 3/1990 | Shuler, Jr. | 395/600 |
| 5,136,706 | 8/1992 | Courts | 395/600 |

OTHER PUBLICATIONS

L. P. Deutsch, et al., "An Efficient, Incremental, Automatic Garbage Collector", *Communications of the ACM*, vol. 19, No. 9, Sep. 1976, pp. 522–526.

H. G. Baker, Jr., "List Processing in Real Time on a Serial Computer", *Communications of the ACM*, vol. 21, No. 4, Apr. 1978, pp. 280–294.

H. Lieberman and Carl Hewitt, "A Real–Time Garbage Collector Based on the Lifetimes of Objects", *Communications of the ACM*, vol. 26, No. 6, Jun. 1983, pp. 419–429.

D. Unger, "Generation Scavenging: A Non–disruptive High Performance Storage Reclamation Algorithm", *ACM*, 1984, pp. 157–167.

Knuth, D., "The Art of Computer Programming Vol. I", 1969, pp. 419–420.

Corporaal et al., "The Design Space of Garbage Collection", IEEE, pp. 423–428, May 1991.

*Primary Examiner*—Thomas G. Black
*Assistant Examiner*—John C. Loomis
*Attorney, Agent, or Firm*—Woodcock Washburn Kurtz Mackiewicz & Norris

[57] ABSTRACT

A storage management is carried out in an information processing system in which a program including functions each treating a list structure data is executed. The storage management method includes the steps of generating list cells in a cell storage area so that the list cells are successively arranged therein while a function is being executed, and of collecting disused list cells from the cell storage area when execution of the function is completed, each of the disused cells being defined as a list cell that will not be used in the program, so that the disused list cells may be reclaimed in the cell storage area.

10 Claims, 9 Drawing Sheets

FIG. IA
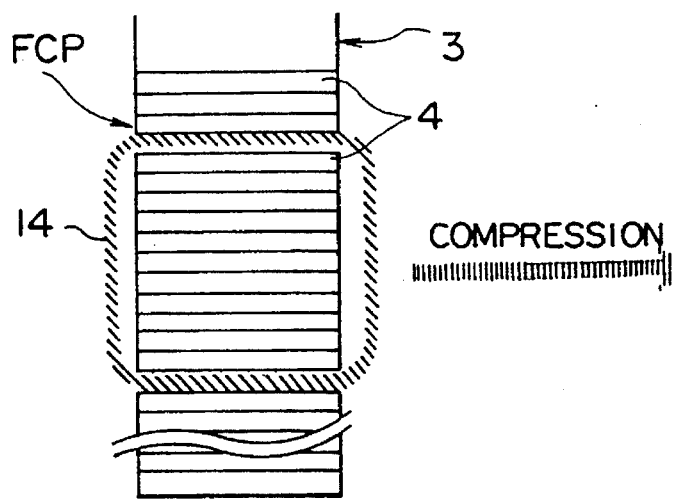
FIG. IB
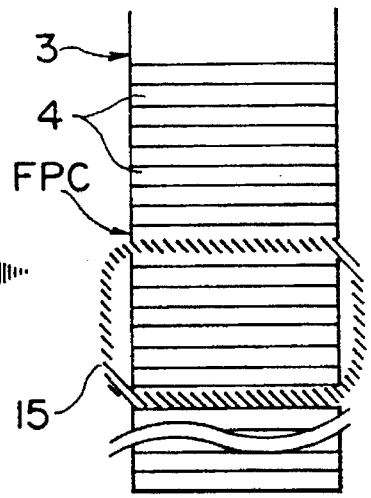
FIG. 2
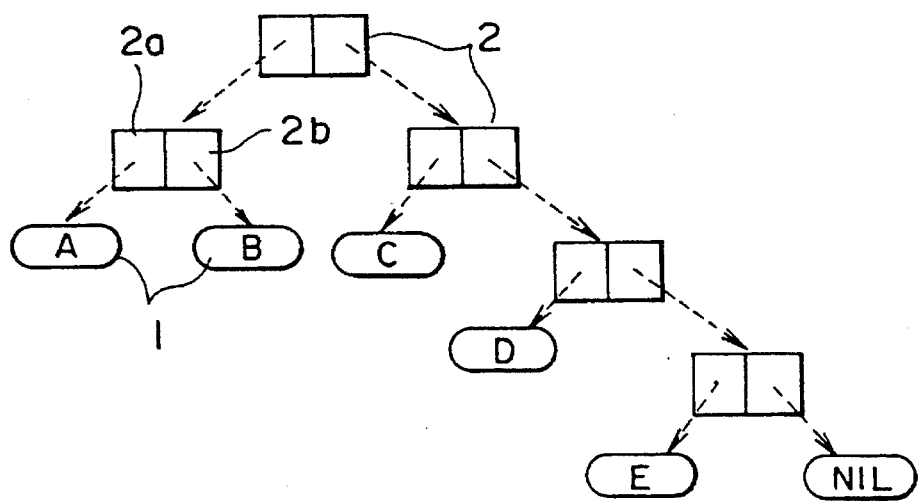

((NAME TOSHIKI KAIFU) (AGE 55) (OCCUPATION PRIME MINISTER)------)
((NAME SATORU NAKAJIMA) (AGE 35) (OCCUPATION F1 RACER)------)
((NAME TARO OKAMOTO) (AGE 75) (OCCUPATION PAINTER)------)
((NAME KYOKO KOIZUMI) (AGE 20) (OCCUPATION SINGER)------)
((NAME WAKAHANADA) (AGE 18) (OCCUPATION SUMO WRESTLER)------)

METHOD OF GARBAGE COLLECTION PERFORMED UPON COMPLETION OF FUNCTION EXECUTION

This is a continuation of U.S. patent application Ser. No. 07/906,481, filed Jun. 30, 1992, now abandoned.

BACKGROUND OF THE INVENTION

(1) Field of the Invention

The present invention generally relates to a storage management method in an information processing system, and more particularly to a storage management method in an information processing system, such as a computer language processing system and a knowledge base system, in which a list data structure is treated.

(2) Description of Related Art

In general, while a program in which a list data structure is treated is being executed, a large amount of disused lists are generated. Thus, a storage area used for executing the program is expanded due to the large amount of the disused lists. To prevent the storage area used for executing the program from being expanded, the information processing system in which the list data structure is treated has a storage management function for collecting and reclaiming the disused lists. The storage management function is referred to as a garbage collection.

In a conventional garbage collection called a mark/sweep method, accessible list cells in a storage area are marked, and then list cells having no mark are collected and reclaimed in the storage area. In a conventional garbage collection called a reference counting method, a number of references to each of list cells in the storage area is counted. A value of the counted number of references is referred to as a reference count. Each list cell for which the reference count has become zero is collected and reclaimed. In a conventional garbage collection called a copy method, a storage area is divided into a first area and a second area, when the first area is filled with list cells, the list cells are copied from the first area into the second area. In addition, a copy method in which generations of list cells are considered has been also proposed. As the garbage collection is automatically executed when an amount of list cells in the storage area reaches a predetermined value, a programmer can be indifferent to the garbage collection.

However, in the conventional information processing system having the function of the garbage collection, a long time is required for executing the garbage collection. Thus, a speed at which the program is executed decreases, or the program is prevented from being executed. In addition, to the execution of the garbage collection, an extra storage area other than that used for storing the lists is required. Thus, the list cells are unevenly distributed in a virtual storage space and a paging occurs, so that efficiency of processing is caused to deteriorate.

In the conventional information processing system, all the list cells in the storage area are objects of the garbage collection. Thus, the information processing system has a large load when executing the garbage collection. In addition, short-lived list cells each of which becomes disused immediately after generation have to be also collected and reclaimed.

SUMMARY OF THE INVENTION

Accordingly, a general object of the present invention is to provide a novel and useful storage management method in an information processing system in which the disadvantages of the aforementioned prior art are eliminated.

A more specific object of the present invention is to provide a storage management method in an information processing system in which disused list cells in a storage area can be efficiently collected and reclaimed.

The above objects of the present invention are achieved by a storage management method in an information processing system in which a program is executed that includes functions each treating a list structure data, the storage management method comprising the steps of: a) generating list cells in a cell storage area so that the list cells are successively arranged therein while a function is being executed; and b) collecting disused list cells from the cell storage area when execution of the function is completed, each of the disused cells being defined as a list cell which will not be used in the program, so that the disused list cells may be reclaimed in the cell storage area.

According to the present invention, a step for collecting disused list cells are carried out when execution of the function is completed. A large number of disused list cells can be included in a cell storage area when the execution of a function is completed. Thus, the disused list cells can be efficiently collected and reclaimed.

Additional objects, features and advantages of the present invention will become apparent from the following detailed description when read in conjunction with the accompanying drawings.

BRIEF DESCRIPTION OF THE DRAWINGS

FIGS. 1A and 1B are diagrams illustrating a compression process of a storage area in a storage management method according to an embodiment of the present invention.

FIG. 2 is a conceptual diagram illustrating a list data structure.

DESCRIPTION OF PREFERRED EMBODIMENTS

Figure 3:
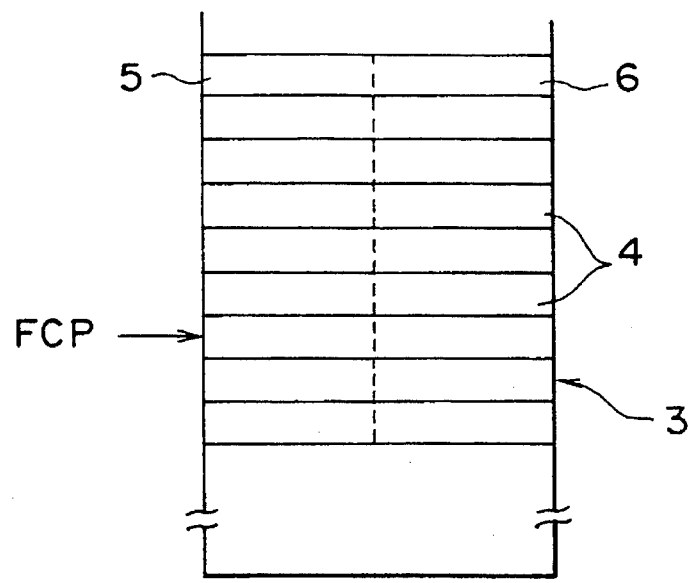
FIG. 3 is a conceptual diagram illustrating a cell storage area used for storing list cells.

A description will now be given of a list data structure treated in a storage management method according to the present invention and of properties of list cells used for representing lists.

FIG. 2 shows an example of a list data structure. Referring to FIG. 2, list cells 2 are successively coupled to each other, so that, for example, a list ((A B) C D E) is represented thereby. Each list cell 2 has two parts; a CAR part 2a and a CDR part 2b. The list is an arrangement of atoms 1 (data) (e.g. A, B, C, D, E, and NIL). The CAR part 2a and CDR part 2b of each list cell store pointers, each indicating an atom 1 or another list cell. List cells representing various lists are located in a predetermined area in a storage. This area is referred to as a cell storage area.

In a case where the list data structure is treated, it can be generally assumed that:

1) it is easier for a new generated list to be disused than for an older list;

2) each of list cells used for representing a list almost always refers to older list cells; and 3) a call level of a function is not very deep except for in a case of a self-recursive call.

The program is executed with reference to list cells in the cell storage area in an information processing system. A list cell satisfying the following conditions is treated as a disused list cell in the information processing system.

CONDITION 1: There is no list cell referring to it.

CONDITION 2: There is no variable referring to it.

List cells satisfying the above conditions 1 and 2 are not accessed at all while the program is being executed. These list cells have to be reclaimed to form new lists. In order to recognize the condition 2, all variables present while executing the program have to be grasped. That is, all external variables, internal variables in functions in a range between a function having a top level of call and a function executed at present, and the like have to be grasped.

In the present invention, external variables in a functional language and internal variables in functions in a static scope may be treated. A lifetime of each type of variable used for executing the program is determined as follows.

a) Lifetime of an external variable is a period from the program's starting to the program's ending b) Lifetime of a static variable in a function is a period from the function's starting to the function's ending c) Lifetime of a formal parameter and an automatical variable is a period in which the function is executed A description will now be given of a storage management method according to an embodiment of the present invention.

To manage list cells in the cell storage area, an internal/static variable management table, a future reference cell management stack, and function information management stack are provided in the information processing system.

FIG. 3 shows a cell storage area 3. A plurality of list cells 4 are located in the cell storage area 3 so as to be successively arranged in a line. Each of the list cells 4 is formed of a CAR part 5 and a CDR part 6. The CAR part 5 and the CDR part 6 store reference addresses for identifying other list cells and atoms. A free cell pointer FCP points to a list cell accessible at present. Initially, the free cell pointer FCP points to a list cell located at the lowest position of the cell storage area 3. A list cell to which the free cell pointer FCP points is supplied to the information processing system every time a request for generating a list cell occurs in accordance with the program. In this case, the free cell pointer FCP proceeds one by one every time the list cell is supplied to the information processing system. When a compression process for collecting disused list cells in the cell storage area 3 and for compressing an area corresponding to used list cells has been carried out, the free cell pointer FCP recedes by a number equal to a number of collected disused list cells.

The static variable management table (not shown in the figures) is used for always storing addresses of external and the static variables in the program. The external variables are recorded in the static variable management table immediately after starting the program. The static variables are recorded in the static variable management table when a function including the static variables is first executed.

Figure 4:
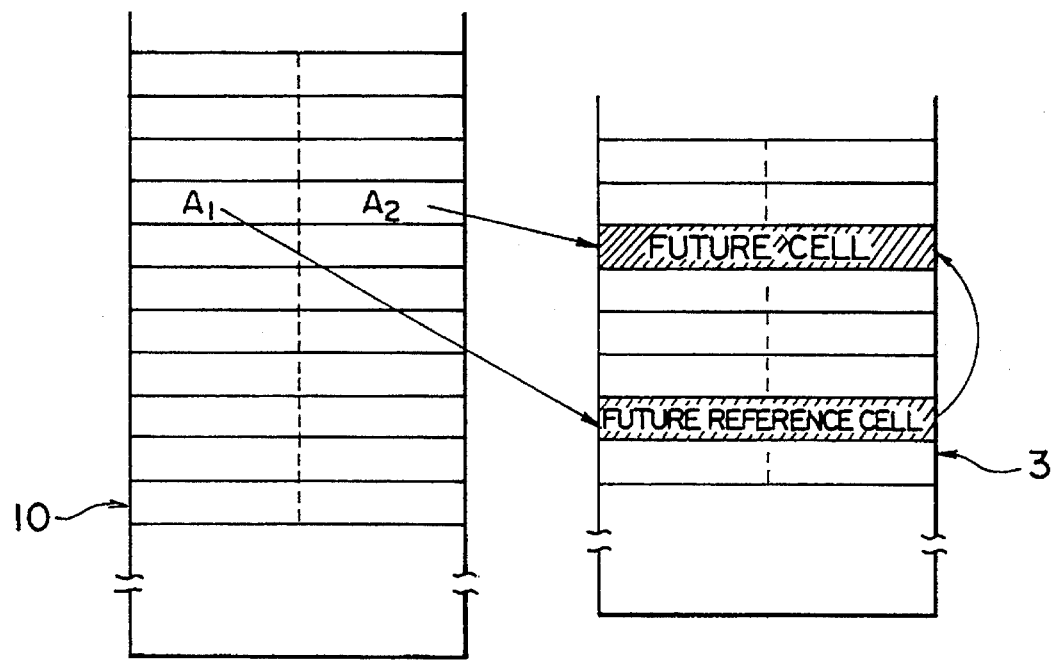
FIG. 4 is a conceptual diagram illustrating a future reference cell management stack.

FIG. 4 shows the future reference cell management stack. The future reference cell management stack 10 relates to the cell storage area 3 as shown in FIG. 4. In general, a new generated list cell has parameters identifying two list cells. Thus, each list cell always refers to older list cells. However, when a reference address of a list cell has been substituted for another one, the list cell can refer to a list cell located behind it in the cell storage area 3. The list cell refers to a list cell located behind it in the cell storage area 3, referred to as a future list cell. When a list cell to which the future list cell refers is moved in the cell storage area due to the compression process of the cell storage area, the address of the list cell becomes incorrect. Thus, in a case where a list cell referring to a future list cell is generated due to an operation (using functions such as RPLACA and RPLACD) for changing contents in a list cell, a first address $A_1$ of the list cell referring to the future list cell and a second address $A_2$ of the future list cell are recorded in the future reference cell management stack 10.

Figure 5:
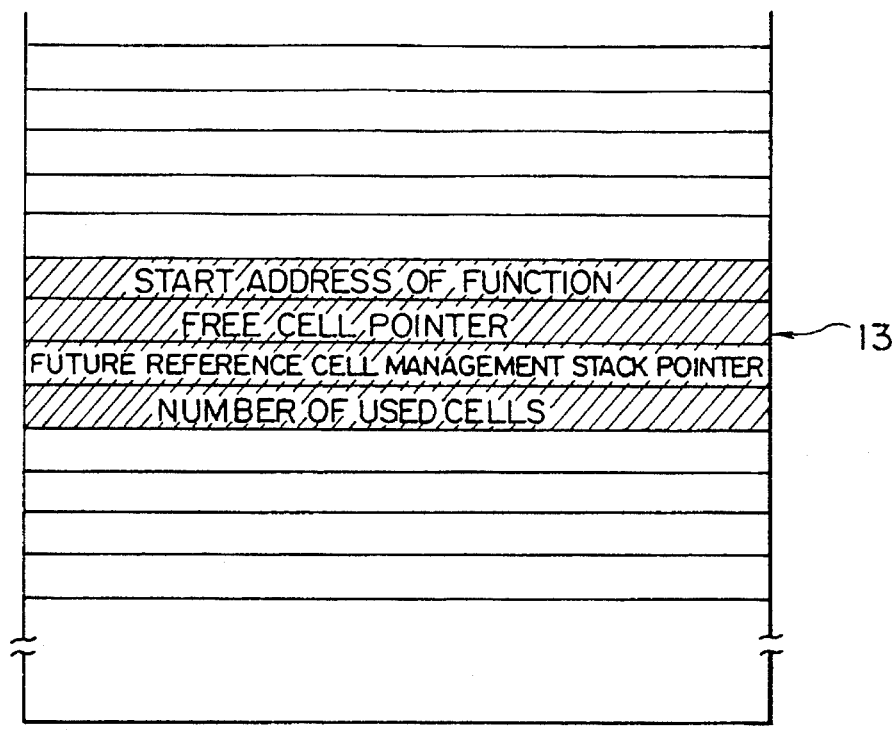
FIG. 5 is a conceptual diagram illustrating a function information management stack.
Figures 14, 15:
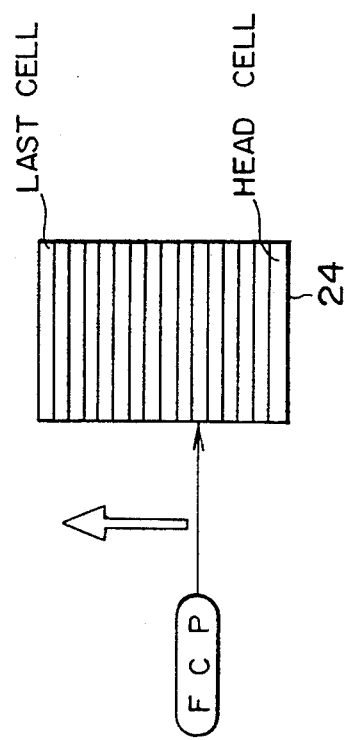
FIG. 14 is a diagram illustrating a structure of a temporary cell storage area.
FIG. 15 is a diagram illustrating an example of a file.

FIG. 5 shows the function information stack. When a function starts to be executed, the following information is stored in the function information stack 13, as shown in FIG. 15.

a) a starting address of the function b) a value of the free cell pointer FCT when the function starts to be executed c) a value of the future reference stack pointer when the function starts to be executed In addition the function information stack 13 has an operating area used for counting a number of used list cells generated in the function. The operation area is initialized at zero. Immediately before returning to a previous function, the information regarding the executed function which information has been stored in the function information stack 13, is removed therefrom. Information regarding a function started first is stored in a lowest area of the function information stack 13, and information regarding a function which is being executed now is stored in a highest area thereof.

It is possible to detect a self-recursive call of a function based on information of a starting address of the function. In a case of the self-recursive call, as the level of call of function can be very deep, a large amount of area is required for the function information stack 13. Thus, in this case, a process regarding the function information stack 13 is interrupted, and the compression process for collecting disused list cells in the cell storage area is interrupted.

Figure 6:
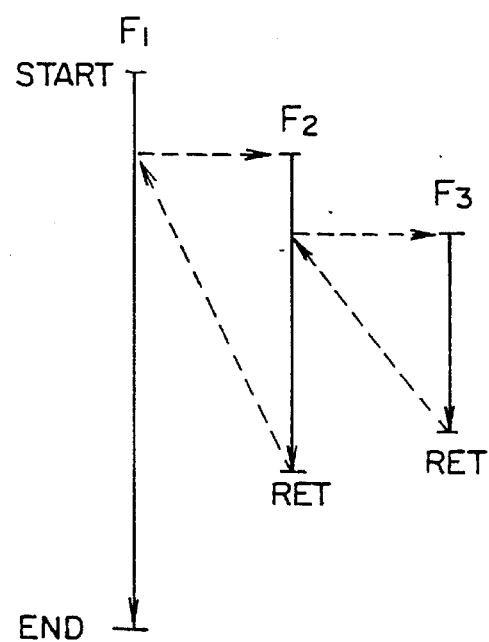
FIG. 6 is a diagram illustrating a program including a plurality of functions.

Three functions $F_1$, $F_2$ and $F_3$ are, for example, as shown in FIG. 6, executed in accordance with a program. Referring to FIG. 6, while the first function $F_1$ is being executed, the second function $F_2$ is called and starts to be executed. Then, while the second function $F_2$ is being executed, the third function $F_3$ is called and starts to be executed. Then, after the third function $F_3$ is completed, the process returns from the third function $F_3$ to the second function $F_2$, and the second function $F_2$ is continuously executed. After the second function $F_2$ is completed, the process returns from the second function $F_2$ to the first function $F_1$, and the first function $F_1$ is continuously executed. Then, when the first function $F_1$ is completed, the program stops being executed.

The compression process for removing the disused cells from the cell storage area is carried out as follows.

While the program is being executed, new list cells are generated in the cell storage area 3, and further, disused list cells also increase in the cell storage area 3. To remove the disused list cells from the cell storage area 3, the compression process is carried out. The compression process is indicated in FIGS. 1A and 1B. Referring to FIGS. 1A and 1B, an area on which the compression process is carried out is set, as a compression object area 14, in the cell storage area 3. Used list cells are selected in the compression object area 14 and are saved from the compression object area 14 to another area (a saving area) in a storage. In this state, only the disused list cells remain in the compression object area 14. The used list cells in the saving area are returned to the compression object area 14 so as to be closely arranged from the lowest position in the compression object area 14, as shown in FIG. 1B. As a result, the disused list cells are removed from the compression object area 14, so that a compressed area 15 in which only the used list cells are located is formed in the cell storage area 3.

While the program is being executed in accordance with the procedure as shown in FIG. 6, every time each function is completed, and immediately before returning, a compression process control step determines whether or not the compression process described above should be carried out. The compression process step will be described later. When the compression process control step determines that the compression process should be carried out, the execution of the program is interrupted and the compression process is carried out. When the compression process control step determines that the compression process should not be carried out, the compression process is not carried out and the program continues to be executed.

List cells are generated while each function is being executed, then the generated list cells are stored in the cell storage area 3. When the function is completed, an area, in which the list cells generated while executing the function (including a function called by it) are located, is set as the compression object area 14 in the cell storage area 3.

The compression process is carried out in accordance with the following steps.

STEP 1: This is a step of copying used list cells from the compression object area 14 to a saving area.

STEP 2: This is a step of updating reference addresses of used list cells in the saving area.

STEP 3: This is a step of copying the used cells from the saving area to the compression object area 14.

STEP 1 is carried out as follows.

Each of the used list cells is defined as a list cell generated while executing a function f and is included in a list which refers the following variables and reference values.

a) static variables in the function f
b) formal parameters in the function f
c) external variables accessed while executing the function f
d) return value of the function f The list cells satisfying the above conditions has to remain in the cell storage area after the function f is completed.

Figure 7A:
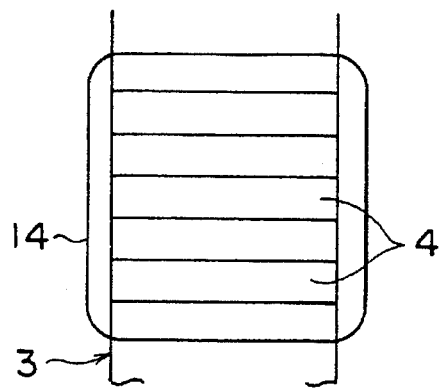
FIGS. 7A and 7B are diagrams illustrating a compression process of a storage area regarding used list cells.
Figure 7B:
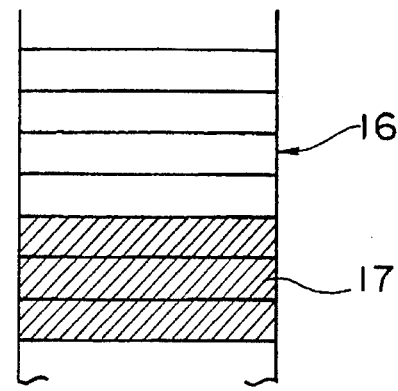

To save the used list cells in the compression object area 14 shown in FIG. 7A, a saving area 16 having a size enough to save the used list cells shown in FIG. 7B is set in the storage. Then the used list cells satisfying the above conditions are saved from the compression object area 14 to the saving area one by one. As a result, the used list cells 17 are closely arranged in the saving area 16 as shown in FIG. 7B.

The list cell to which variables refer is moved from the compression object area 14 to the saving area 16. Thus, a reference value of each variable has to be updated from a cell address in the compression object area 14 to that in the saving area 16. However, reversely, the used list cell must be copied from the saving area 16 to the compression area 14 in STEP 3 described below. In this case, the reference value of each of the variables is updated from a cell address in the saving area 16 to an address in the compression object area 14. To avoid twice updating the reference value of each variable as has been described above, in STEP 1, the reference value of each variable is updated so that a relative address in the compression object area 14 is equal to a cell address in the saving area 16. That is, the following equation is satisfied;

$$Ad = Ad(c) - Ad(ss) + Ad(cs) \quad (1)$$

where Ad is a reference address of each variable, Ad(c) is a cell address in an area to which the list cell is copied, Ad(ss) is a starting address of the saving area 16, and Ad(cs) is a starting address of the compression object area 14.

STEP 2 is carried out as follows.

Figure 8A:
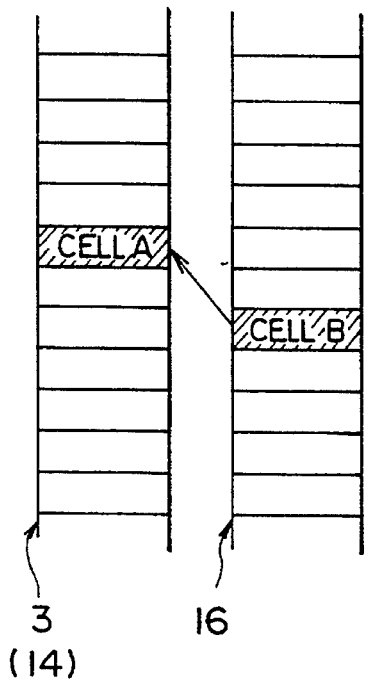
FIGS. 8A, 8B and 8C are diagrams illustrating examples of processes for updating reference addresses.
Figure 8B:
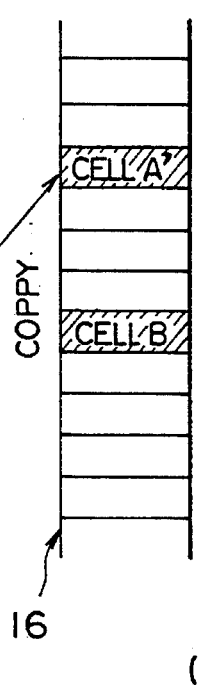
Figure 8C:
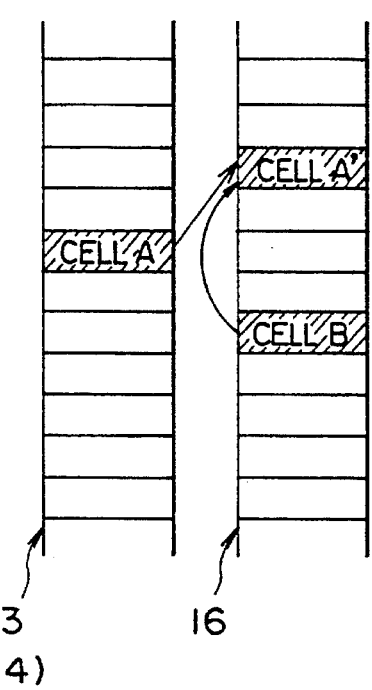

The list cells in the saving area 16 are successively searched from the lowest position to the highest position. Then, in a case where a list cell B refers to a list cell A in the compressed object area 14 as shown in FIG. 8A, the list cell A is copied from the compression area 14 to the saving area 16 so that a new list cell A' corresponding to the list cell A is generated in the saving area 16 as shown in FIG. 8B. The list cell B refers to the new list cell A' as shown in FIG. 8C, in the saving area 16 An address (a forward address) of the new list cell A' in the area to which the list cell A is copied is stored in the list cell A.

Figures 9A, 9B:
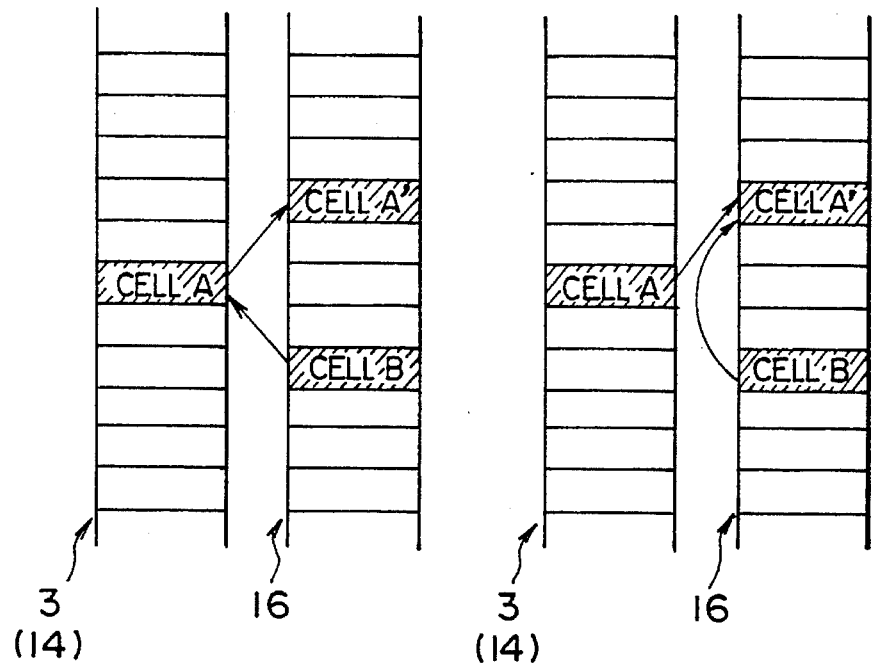
FIGS. 9A and 9B are diagrams illustrating other examples of processes for updating reference addresses.

In a case where the list cell B stored in the saving area 16 refers to a list cell A' which has been copied in the saving area 16, as shown in FIG. 9A, the reference address is changed so as to indicate the forward address as shown in FIG. 9B.

After the above processes are finished, the future reference management stack 10 is searched, and it is determined whether or not a list cell referring to the list cell saved to the saving area 16 is recorded in the future reference management stack 10. If recorded, the reference value is updated in accordance with the equation (1) so that the relative address in the compression area 14 is equal to that in the saving area 16. In searching the future reference management stack 10, only the future reference cells recorded in the function f are searched.

STEP 3 is carried out as follows.

Figure 10:
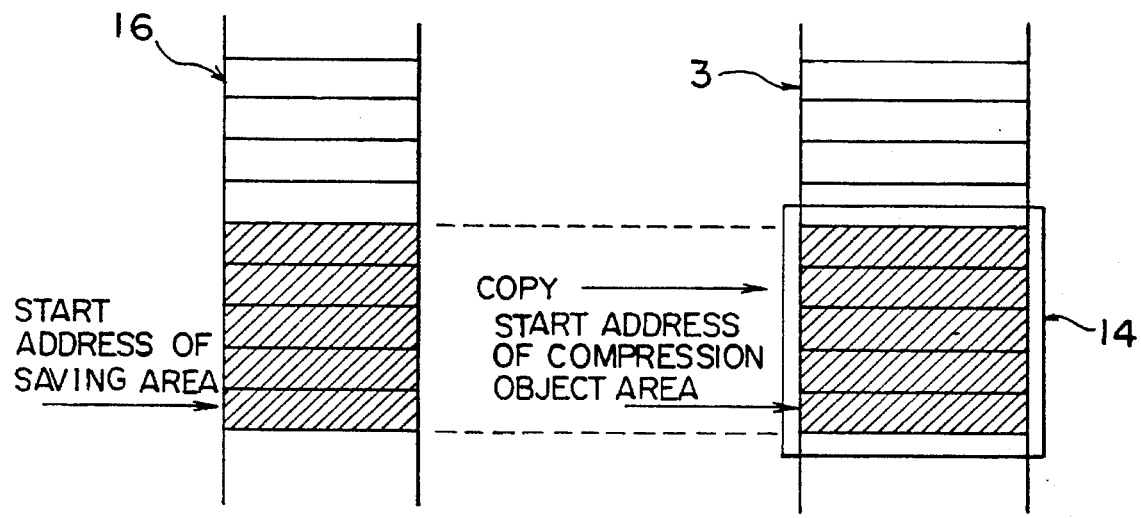
FIG. 10 is a diagram illustrating a copy process for copying list cell from a compressed storage area to a cell storage area.
Figure 11:
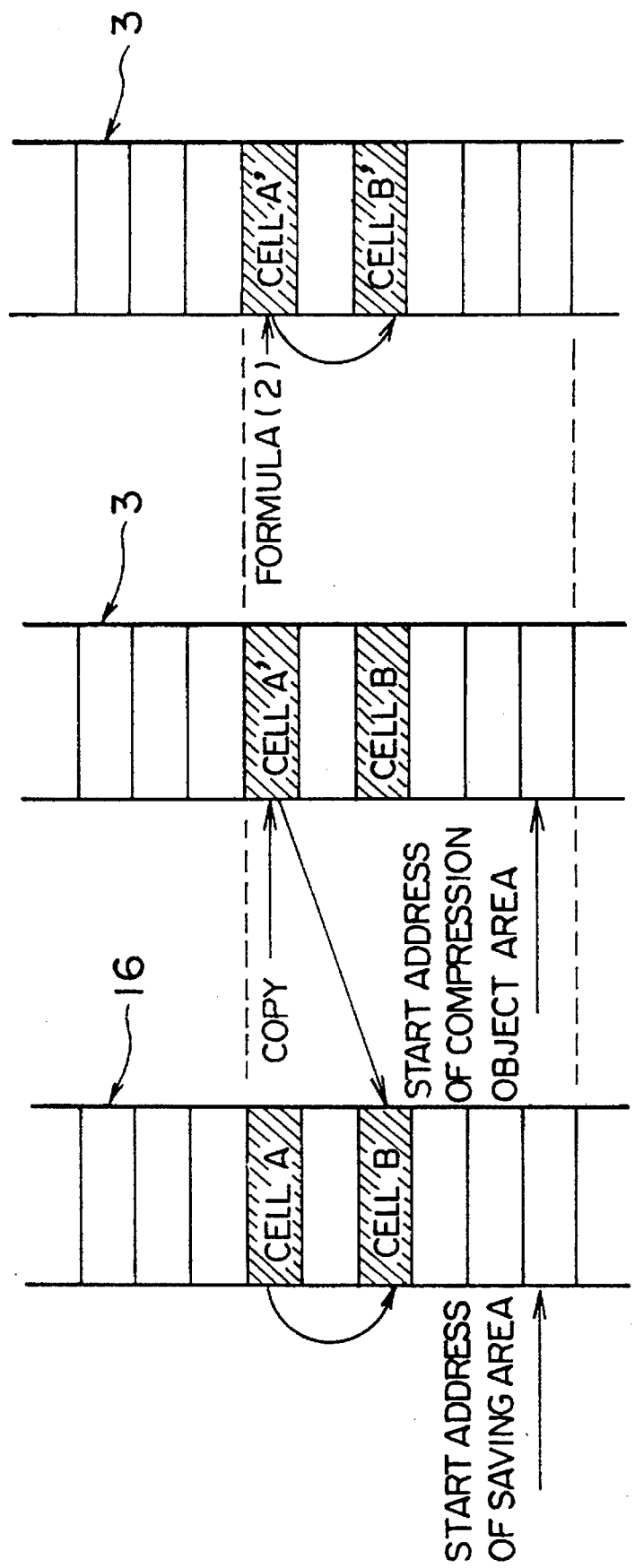
FIG. 11 is a diagram illustrating an example of a process for updating reference addresses.

In STEP 3, the used list cells saved in the saving area 16 are copied to the compression object area 14. That is, the saving area 16 is scanned from the lowest position, and scanned list cells are copied from the saving area 16 to the compression object area 14, as shown in FIG. 10, so that the list cells are closely arranged from the lowest position in the compression object area 14. In a case where a list cell refers to a list cell in the saving area 16, the reference address is changed in accordance with the following equation (2);

$$Ad = Ad(s) - Ad(ss) + Ad(cs) \quad (2)$$

where Ad is a cell address in the cell storage area, Ad(s) is a cell address in the saving area 16, Ad (ss) is a starting address in the saving area 16, and Ad(cs) is a starting address in the compression object area 14. According to the above equation (2), each cell address in the saving area 16 is converted into a cell address in the compression area 14 so that the relative address in the saving area 16 is equal to that in the compression area 14, as shown in FIG. 11.

The compression process control step, carried out every time each function is completed, will be described below.

The higher the ratio of disused list cells to accessible list cells in the compression object area 14, the more efficiently the disused list cells can be collected by the compression process. It is preferable that the compression process not be frequently repeated, since the number of moving the list cells between the compression object area 14 and the saving area 16 increases. Thus, it is desirable that the compression process be carried out in only a case where the compression object area has a size greater than a predetermined size and where a ratio of disused list cells to list cells in the compression object area is high. Thus, in the compression process control step, the ratio of disused list cells to list cells in the compression object area 14, and the size of the compression object area are respectively calculated. Then, it is determined, based on the calculating results, whether or not the compression process can be efficiently carried out. The compression process is carried out, only when compression process control step determines that the compression process can be efficiently carried out.

The compression process control step is carried out as follows.

Here, for the sake of simplicity, it is assumed that a function called in the function f does not include static variables and external variable.

A number ($N_{new\ cell}$) of new list cells generated from the start of execution of the function f to the end thereof is calculated in accordance with the following formula (3);

$$N_{new\ cell} = (FCP2 - FCP1)/S \qquad (3)$$

where FCP1 is a value of the free cell pointer at a time of the start of execution of the function f, FCP2 is a value of the free cell pointer at a time of the end of execution of the function f, and S is a size of each list cell. After the function is completed, the compression area 14 includes used list cells. The used list cells may include the following variables.

a) a return value of the function f b) variables accessed in the function f c) static variables in the function f Thus, all list cells constrained by the above variables are searched in the compression object area 14. Then the number of the new list cells generated while executing the function f is measured. It is determined, based on the following condition, whether or not each list cell is a new list cell;

$$FCP1 < CA < FCP2 \qquad (4)$$

where CA is a cell address.

Thus, a ratio (R) of disused cells to list cells in the compression object area 14 is calculated in accordance with the following formula (5);

$$R = (N_{new\ cell} - N_{used\ cell})/N_{new\ cell} \qquad (5)$$

where $N_{new\ cell}$ is the number of new list cells, and $N_{used\ cell}$ is the number of used list cells. The ratio (R) of disused cells to list cells in the compression object area 14 is referred to as a Rate of Garbage.

In a case where a function called by the function f includes static variables and external variables, there are list cells constrained by the above static variables and external variables. Thus, the number of used cells has to be calculated in due consideration of the list cells constrained by the static variables and the external variables. Thus, when the function f is completed, the number of used cells generated in the function f has to be supplied to a function calling the function f. The function calling the function f is referred to as an upper level function. That is, a used cell counting area in the function information management stack 13 is used, the number of used list cells generated in the function f is added to the used cell counting area in the function information management stack 13 of the upper level function.

Figure 12:
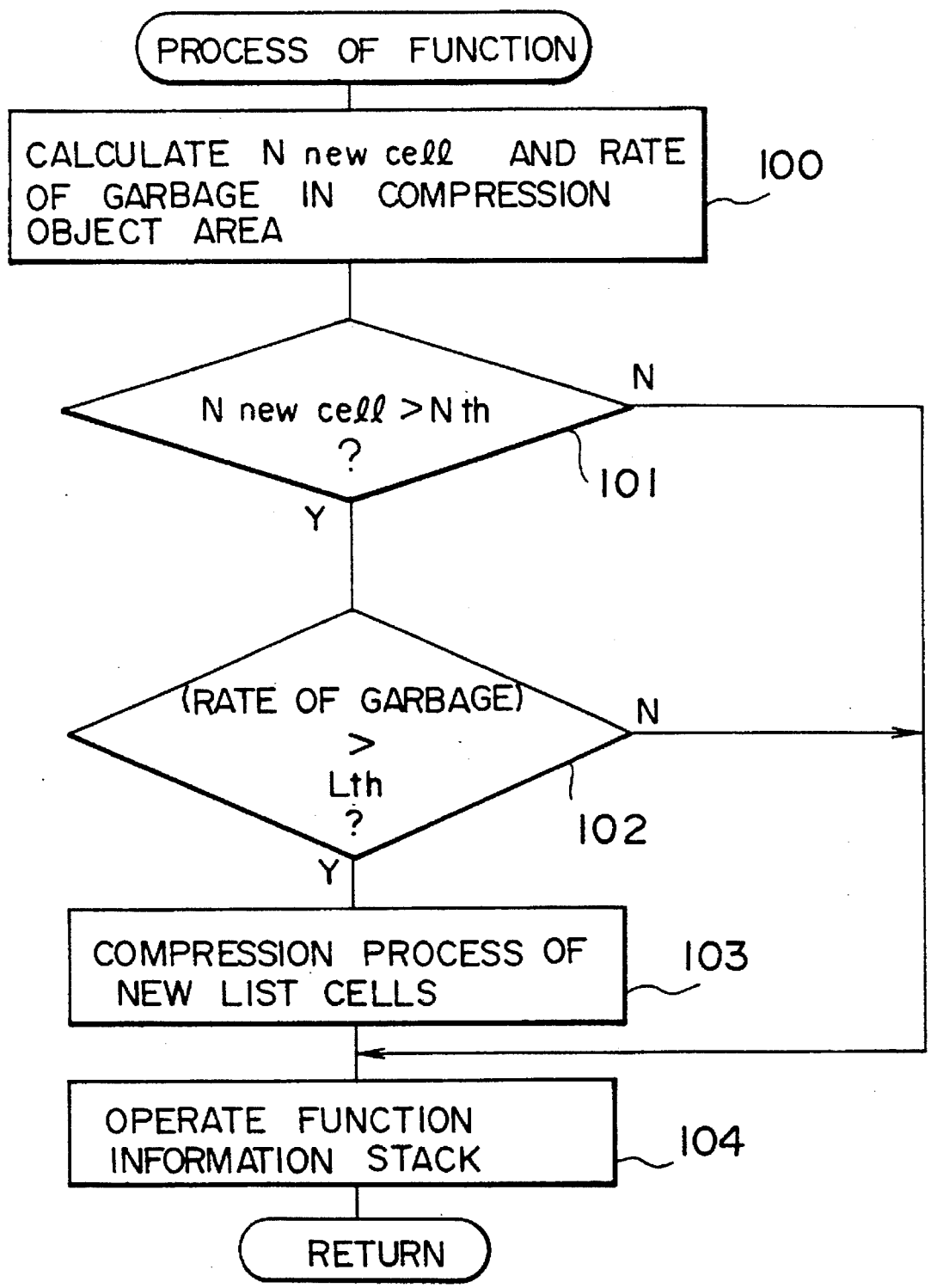
FIG. 12 is a flow chart illustrating a procedure of a compression process.

The compression process control step is carried out in accordance with a procedure shown, for example, in FIG. 12.

Referring to FIG. 12, after a process regarding the function f is completed, step 100 calculates the number ($N_{new\ cell}$) of new list cells generated in the function f and the rate (R) of Garbage in accordance with the above formulas (3) and (5). Then step 101 determines whether or not the number ($N_{new\ cell}$) of new list cells generated in the function is greater than a threshold number ($N_{th}$). That is, the step 101 determines whether or not the compression object area 14 has a size large enough to efficiently carry out the compression process. When the result obtained in step 101 is YES, step 102 determines whether or not the rate (R) of Garbage is greater than a threshold level ($L_{th}$). That is, step 102 determines whether or not a ratio of the disused list cells to the list cells in the compression object area 14 has a value large enough to efficiently carry out the compression process. When the result obtained in step 102 is YES, step 103 carries out the compression process with respect to the compression object area 14 formed of the new list cells generated in the function f. After step 103, step 104 operates the function information stack 13, and then the process returns to the upper level function.

In a case where the result obtained in step 101 or 102 is NO, step 103 is skipped. That is, the compression process described above is not carried out.

The threshold number ($N_{th}$) and the threshold level ($L_{th}$) respectively used in steps 101 and 102 have been previously set to optimum values.

According to the above embodiment, it is determined, based on the number of new list cells generated in the function and the ratio of disused list cells to the new list cells, whether or not the compression process (the garbage collection) should be carried out every time each function is completed. Then, only when it is determined that the compression process should be carried out, the compression process is carried out. Thus, the compression process can be efficiently carried out.

In addition, the used list cells saved in the saving area 16 are copied to the compression object area 14 so as to be closely arranged therein. Thus, the used list cell are prevented from being unevenly distributed in a virtual storage space.

A description will be given, with reference to FIGS. 13, 14 and 15, of an example of a structure of the cell storage area.

Figure 13:
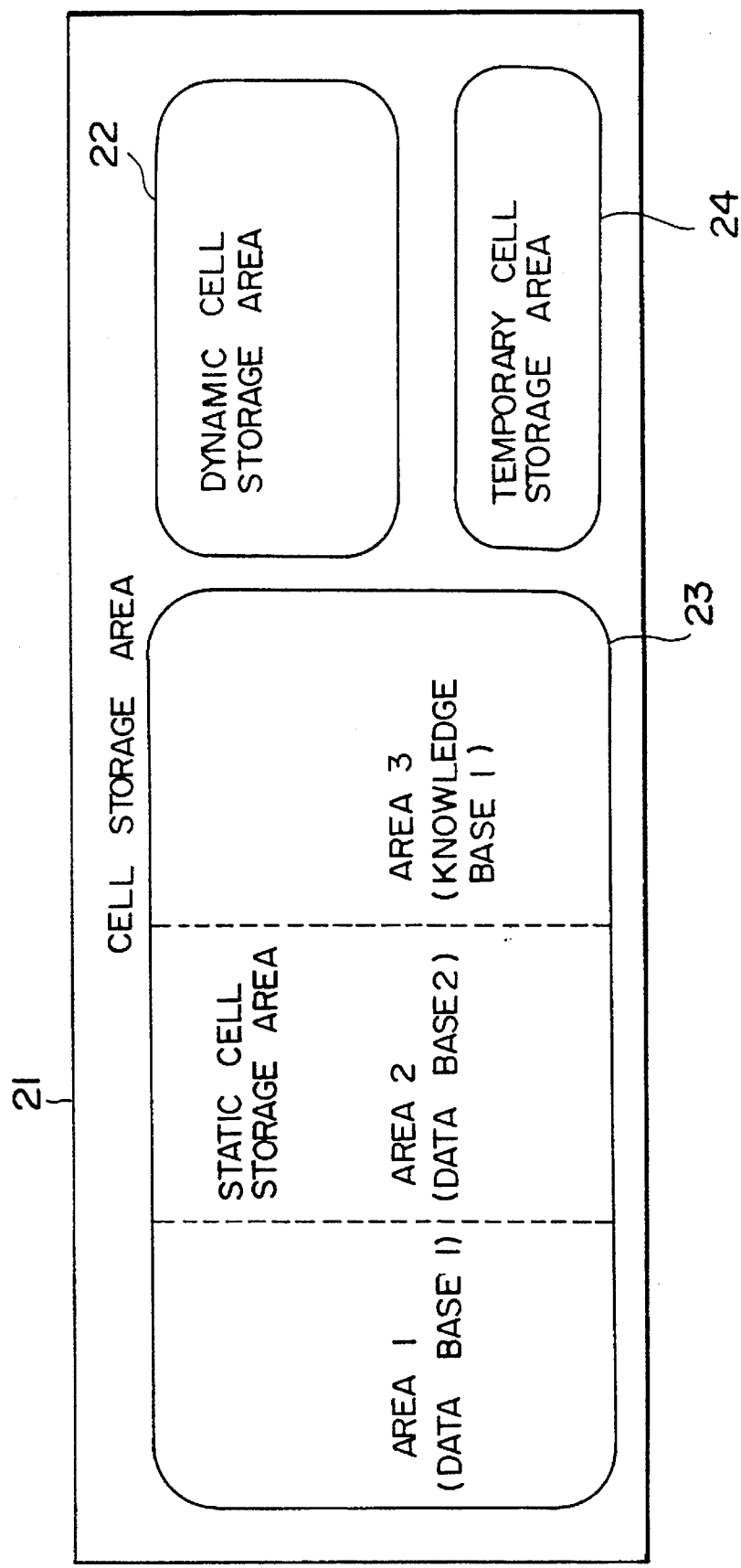
FIG. 13 is a diagram illustrating a structure of a cell storage area.

FIG. 13 shows a structure of the cell storage area. Referring to FIG. 13, the cell storage area 21 is divided into a dynamic storage area 22, a static storage area 23 and a temporary storage area 24. A garbage collection is carried out with respect to the dynamic storage area 22. The garbage collection is defined as a storage management process for automatically collecting and reclaiming disused list cells generated while executing a program. The garbage collection corresponds to the compression process described above.

List cells are successively arranged in the static storage area 23, and the static storage area 23 is not affected by the garbage collection. Thus, a list cell generated in the static storage area 23 is maintained therein until the program is completed.

List data stored in the static storage area 23 must have information concerning a size thereof, and a property by which contents of the list data hardly vary while the program is executed. Thus, the static storage area 23 is preferably used for storing a knowledge base and a data base contents of which are hardly changed during executing of the program. When the knowledge base and the data base are loaded from a file, an area having a size corresponding to the knowledge base and the data base is secured by an operating system as the static storage area 23 in a storage. List cells used for expressing the knowledge base and the data base are supplied from the static storage area 23. As data stored in the static storage area 23 is not affected by the garbage collection, a load required for executing the garbage collection can decrease.

The temporary storage area 24 has a relatively small size and is not affected by the garbage collection. List cells are closely arranged in the temporary storage area 24. The free cell pointer FCP points out a list cell which can be used now in the temporary storage area 24, as shown in FIG. 14. Initially, the free cell pointer FCP points out a head list cell in the temporary storage area 24. Every time a new list cell is generated, the list cell pointed at by the free cell pointer FCP is supplied from the temporary storage area 24 to the system, and then the free cell pointer FCP is incremented by one list cell. When a new list cell is generated in a state where the free cell pointer points out a last list cell, the free cell pointer FCP returns to the head list cell. As the free cell pointer FCP of the temporary storage area 24 can return from the last list cell to the head list cell, the temporary storage area can be preferably used for storing temporary data lists for input/output operations.

When data is supplied from a file, the temporary storage area 24 is used, for example, as follows.

An input file 25 has list structure data as shown in FIG. 15. The program reads lists from the file 25 one by one. For example, to obtain an occupation of a person from the file 25, only a part of the lists read by the program is needed. That is, remaining lists are disused. Thus, in a case where the above input process is carried out, lists to be read are copied from the temporary storage area 24 to a predetermined area in the storage.

In a case where the static storage area 23 and/or the temporary storage area 24 are provided in the cell storage area 21, as the static storage area 23 and the temporary storage area 24 are not affected by the garbage collection, the number of disused list cells to be collected and reclaimed in the garbage collection can be decreased.

The present invention is not limited to the aforementioned embodiments, and variations and modifications may be made without departing from the scope of the claimed invention.

What is claimed is:

1. A storage management method in an information processing system in which a program is executed, the program including functions which each treat list structure data, said storage management method comprising:

a) generating list cells in a cell storage area so that the list cells are successively arranged in said cell storage area while a function is being executed; and b) upon completion of functions in the program, collecting from said cell storage area disused list cells constituting list cells which will not be used in the program, only when a ratio of:

space unused at function completion to space used while the function is executed crosses a threshold, so that said disused list cells in said cell storage area may be efficiently reclaimed.

2. A method as claimed in claim 1, wherein the function is called by another function referred to as an upper level function, and wherein said step (b) is carried out immediately before a process returns from the function to the upper level function.

3. A method as claimed in claim 1, wherein said step (b) comprises the steps of:

(b-1) setting an object area in said cell storage area, said object area being an area in which said disused list cells are to be collected;

(b-2) saving used list cells from said object area to a saving area, each of said used list cells being defined as a list cell which will be used in the program; and (b-3) copying said used list cells from said saving area to said object area so that said used list cells are closely arranged therein, whereby said disused list cells can be reclaimed in said cell storage area.

4. A method as claimed in claim 3, wherein said object area set by step (b-1) is an area in which new list cells generated in the function are arranged.

5. A method as claimed in claim 4, further comprising a step of:

(c) determining whether or not said object area set by said step (b-1) has a size large enough to efficiently collect the disused list cells, wherein, when said step (c) determines that said object area has a size large enough to efficiently collect the disused list cells, said steps (b-1) and (b-2) are carried out.

6. A method as claimed in claim 5, wherein said step (c) comprises a step of:

(c-1) determining whether or not a number of the new list cells generated in the function is greater than a predetermined reference number, said step (c) determining that said object area has a size large enough to efficiently collect the disused list cells when said step (c-1) determines that the number of the new list cells is greater than the reference number.

7. A method as claimed in claim 5, further comprising a step of:

(d) determining whether or not a ratio of the disused list cells to the new list cells generated in the function is a value large enough to efficiently collect the disused list cells, wherein, when said step (c) determines that said object area has a size enough to efficiently collecting the disused list cells and said step (d) determines that the ratio of the disused list cells to the new list cells is a value large enough to efficiently collect the disused list cells, said steps (b-1) and (b-2) are carried out.

8. A method as claimed in claim 7, wherein said step (d) comprises a step of:

(d-1) determining whether or not the ratio of the disused list cells to the new list cells generated in the function is greater than a predetermined reference value, said step (d) determining that the ratio of the disused list cells to the new list cells is a value large enough to efficiently collect the disused list cells when said step (d-1) determines that the ratio of the disused list cells is greater than the reference value.

9. A method as claimed in claim 1, wherein said cell storage area has a dynamic storage area in which list cells to which said step (b) is applied are generated and a static storage area in which list cells to which said step (b) is not applied are generated, each of the list cells in said static storage area being unchanged while the program is being executed.

10. A method as claimed in claim 9, wherein said cell storage area further comprises a temporary storage area in which list cells to which said step (b) is not applied are generated, each of said list cells in said temporary storage area having a short lifetime.

* * * * *